United States Patent
Schnieders et al.

(10) Patent No.: US 7,425,114 B2
(45) Date of Patent: Sep. 16, 2008

(54) SHAFT SEAL FOR A TRANSMISSION EXPANDER OR COMPRESSOR, AND TRANSMISSION EXPANDER OR COMPRESSOR HAVING A SHAFT SEAL

(75) Inventors: Werner Schnieders, Heiden (DE); Klaus Thieme, Oberhausen (DE)

(73) Assignee: Man Turbo AG, Oberhausen (DE)

( * ) Notice: Subject to any disclaimer, the term of this patent is extended or adjusted under 35 U.S.C. 154(b) by 0 days.

(21) Appl. No.: 11/510,927

(22) Filed: Aug. 28, 2006

(65) Prior Publication Data
US 2007/0077142 A1 Apr. 5, 2007

(30) Foreign Application Priority Data
Aug. 29, 2005 (DE) .................. 10 2005 041 003

(51) Int. Cl.
*F01D 11/02* (2006.01)
(52) U.S. Cl. .................. 415/112; 415/230; 415/174.5
(58) Field of Classification Search .............. 415/174.5, 415/109, 111, 112, 230; 277/415
See application file for complete search history.

(56) References Cited

U.S. PATENT DOCUMENTS

| | | | | |
|---|---|---|---|---|
| 3,966,351 A | * | 6/1976 | Sproule | 415/110 |
| 4,193,603 A | * | 3/1980 | Sood | 277/304 |
| 6,330,790 B1 | * | 12/2001 | Arora et al. | 60/39.08 |
| 6,969,231 B2 | * | 11/2005 | Ghasripoor et al. | 415/173.4 |

* cited by examiner

*Primary Examiner*—Ninh H Nguyen
(74) *Attorney, Agent, or Firm*—Cohen Pontani Lieberman & Pavane LLP

(57) ABSTRACT

A shaft seal for a transmission expander or compressor having at least one rotor which rotates in a housing and is arranged in a floating manner on a shaft, the shaft seal having a seal arrangement with seal tips attached on the hub of the rotor. A stationary sealing ring surrounds the seal tips which are arranged in three seal sections. An annular chamber is arranged between in each adjacent pair of seal sections. The annular chamber which faces the interior of the transmission expander or compressor is equipped with a feed means for a sealing gas, the pressure of which is higher than the pressure in the interior of the transmission expander or compressor. The annular chamber which faces away from the interior of the transmission expander or compressor is provided with an extraction means for the sealing gas.

5 Claims, 2 Drawing Sheets

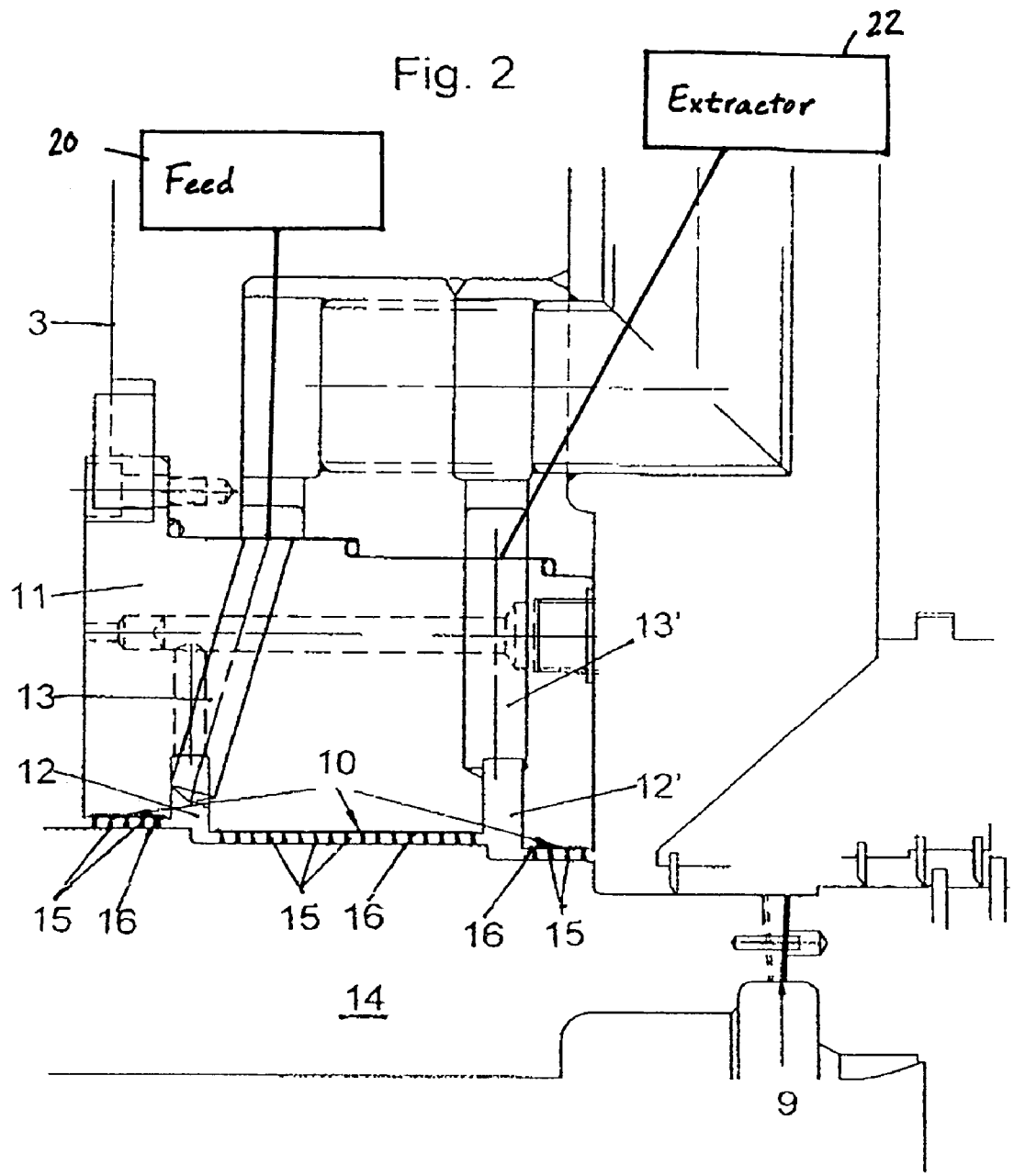

SHAFT SEAL FOR A TRANSMISSION EXPANDER OR COMPRESSOR, AND TRANSMISSION EXPANDER OR COMPRESSOR HAVING A SHAFT SEAL

BACKGROUND OF THE INVENTION

The present invention relates to a shaft seal for a transmission expander or a transmission compressor and a transmission expander or a transmission compressor having a shaft seal.

The sealing of the process space in the shaft region of a transmission expander or compressor is one of the most important features for the reliable operation of a transmission machine. The reliable operation of a transmission machine has an even greater significance if the operation takes place with aggressive or toxic gases. To prevent the aggressive or toxic gas from escaping out of the machine region into the open, the configuration of the seal is critical.

SUMMARY OF THE INVENTION

An object of the present invention is to provide a shaft seal such that the amount of sealing gas or the leakage is low and that the shaft seal is protected against corrosion.

The object is met by a shaft seal in a transmission expander or compressor, wherein the transmission expander or compressor has at least one rotor rotatably arranged in a housing, the at least one rotor being arranged in a floating arrangement on an output shaft. The shaft seal includes a seal arrangement connected to the housing sealing the rotor, the seal arrangement comprising seal tips arrangeable on one of the shaft or a hub of the rotor. The seal tips are arranged in three seal sections which lie behind one another between an area in the interior of the transmission expander or compressor and the ambient atmosphere surrounding the transmission expander or compressor. A stationary sealing ring surrounds the seal tips, wherein the sealing ring defines two annular chambers, each being arranged between two adjacent ones of the seal sections. A feed is connected to the one of the annular chambers arranged closer to the interior of the transmission expander or compressor, the feed having a sealing gas at a pressure higher than the pressure in the interior of the transmission expander or compressor, and an extractor is connected to the one of the annular chambers arranged farther away from the interior of the transmission expander or compressor for extracting the sealing gas from the seal arrangement.

The shaft seal designed according to the present invention is configured so that part of the sealing gas flows into the interior of the machine and the other part of the sealing gas flows in the direction of extraction means. This configuration prevents the penetration of process gas into the seal. To keep the amounts of sealing gas or leakages small, a number of seal tips are arranged which are turned from solid material and which constrict the gap between the shaft and the seal as far as possible. In addition, the surface opposite the seal tips is provided with a break-in coating to minimize the amounts of sealing gas or leakages. The advantage of the break-in coating is that it provides a high temperature resistance of approximately 750° C. and that is provides very satisfactory corrosion resistance. Moreover, an optimum relationship of erosion of the coating by solid particles in the sealing gas and in the wear of the seal tips is achieved by the composition of the break-in coating.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views:

FIG. 2 is an enlarged sectional view of the area 11 from FIG. 1.

DETAILED DESCRIPTION OF THE PRESENTLY PREFERRED EMBODIMENTS

Figure 1:
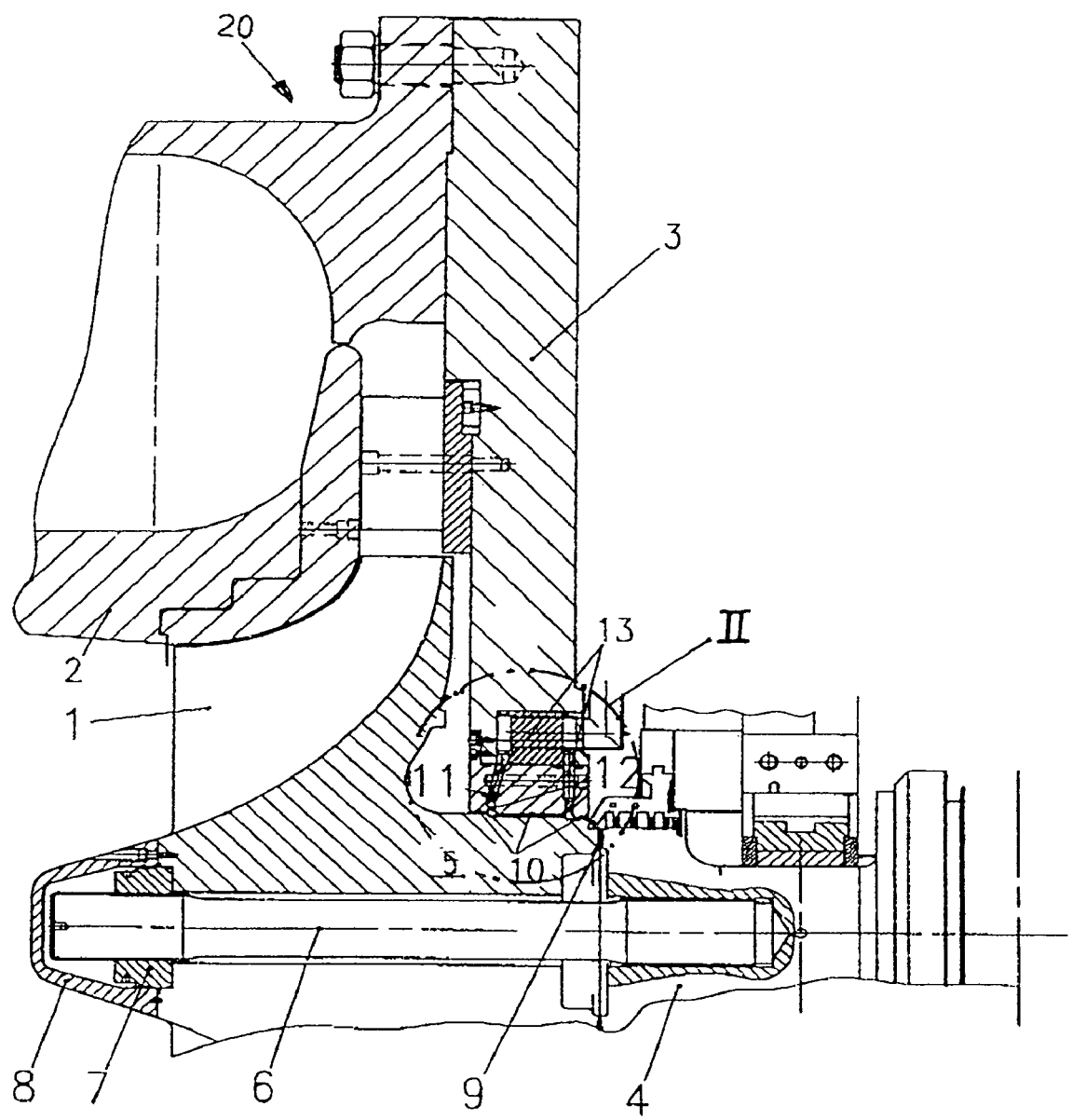
FIG. 1 is a longitudinal sectional view through a portion of a transmission expander according to an embodiment of the present invention.

The transmission expander shown in FIGS. 1 and 2 is a single-shaft expander of. radial construction for relieving air, steam or combustible or toxic gases. The following embodiments also relate to multiple-shaft expanders and to transmission compressors of radial construction in single-shaft or multiple-shaft configurations.

The expander comprises a rotor 1 which rotates in a housing 20. The housing 20 comprises an inflow part 2 and a rear wall 3. The expander drives a motor/generator directly or indirectly via a transmission (not shown) which is connected in between.

Only one output shaft 4 of the output of the expander is visible in FIG. 1. The rotor 1 is arranged in a floating manner on the output shaft 4. To this end, a hub 5 of the rotor 1 is connected to the output shaft 4 via a central tie rod 6. The tie rod 6 penetrates the hub 5 of the rotor 1 and the output shaft 4. Here, the tie rod 6 engages with a thread into an internal thread in the output shaft 4 and is tensioned via a nut 7 in a break-in cap 8 of the rotor 1.

The hub 5 of the rotor 1 and the output shaft 4 are provided in each case with a toothing system 9 on the end faces which lie opposite one another. The teeth of the toothing system 9 engage into one another and together form a toothing system of the radial serration type. The torque is transmitted from the rotor 1 to the output shaft 4 by the toothing system 9 in conjunction with the central tie rod 6.

The interior or process space of the expander is sealed with respect to the external atmosphere by a seal arrangement 10 which is accommodated in a stationary sealing ring 11 connected to the rear wall 3 of the housing of the expander.

The seal arrangement 10 which will be described in greater detail in the following text encloses a rearward extension of the hub 5 of the rotor 1, which rearward extension is configured as a journal 14 (see FIG. 2). As a result of this arrangement, the toothing system 9 between the hub 5 of the rotor 1 and the output shaft 4 is moved outwards into the atmospheric region which surrounds the expander. The toothing system 9 therefore does not come into contact with the process gas in the interior of the expander. As a result, for the case where the expander is operated with aggressive media, there is no longer a risk that these media come into contact with the toothing system 9 as a result of leakage and lead to corrosion of the toothing system 9.

The seal of the seal arrangement 10 is configured as a labyrinth seal in a triple configuration and comprises three seal sections which lie one behind another with respective seal tips 15. The seal tips 15 are attached to the hub 5 of the rotor 1 and are turned from solid material. An annular chamber 12, 12' which is connected to a line 13, 13' which is led to the outside is situated in each case between two seal sections. A sealing gas at a pressure which exceeds the pressure of the process gas in the interior of the expander is fed via the line 13 to the annular chamber 12 which faces the expander from a feed 20 (shown schematically). Sealing gas is extracted by an extractor 22 (shown schematically) via the line 13' from the annular chamber 12' which faces the toothing system 9 and faces away from the expander. This achieves the situation where part of the sealing gas flows in the direction of the rotor and the other part of the sealing gas flows in the direction of the extraction means, as a result of which penetration of process gas into the seal is prevented.

That seal face on the sealing ring 11 which lies opposite the seal tips 15 is coated with a break-in coating 16 comprising an APS (air plasma spray) coating consisting of a sealing CoNiCrAlY adhesive layer and a porous CoNiCrAlY-BN-polyester upper layer. The two layers have the following chemical composition:

adhesive layer: 32% Ni, 21% Cr, 8% Al, 0.4% Y, Co rest; and upper layer: 25% Ni, 17% Cr, 6% Al, 0.4% Y, 63.6% boron nitride (BN), 15% polyester, Co rest.

The adhesive layer serves for improved adhesion of the upper layer and for improved corrosion resistance of the coating. To optimize the break-in property, the porosity of the coating is also set in a targeted manner in addition to the hardness. The porosity is preferably 40%.

The manufacturing process of the break-in coating 16 on the sealing ring 11 comprises the following steps:

1. spraying the adhesive layer on the sealing ring according to the APS process;

2. spraying the upper layer on the sealing ring according to the APS process, the upper layer consisting of CrNiCrAlY-BN-polyester; and 3. thermal treatment/annealing of the sealing ring 11 so that the polyester component is outgassed and the defined porosity is set.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A shaft seal in a transmission expander or compressor, wherein the transmission expander or compressor has at least one rotor rotatably arranged in a housing, said at least one rotor being arranged in a floating arrangement on an output shaft, said shaft seal comprising a seal arrangement connected to the housing sealing the rotor, said seal arrangement comprising:

seal tips arrangeable on one of the shaft or a hub of the rotor, said seal tips being arranged in three seal sections which lie behind one another between an area in the interior of the transmission expander or compressor and the ambient atmosphere surrounding the transmission expander or compressor;

a stationary sealing ring surrounding said seal tips and defining two annular chambers, each annular chamber being arranged between two adjacent ones of said seal sections, said sealing ring comprising a sealing face which lies opposite said seal tips and includes a break-in coating;

a feed connected to the one of the annular chambers arranged closer to the interior of the transmission expander or compressor, said feed arranged for feeding a sealing gas at a pressure higher than the pressure in the interior of the transmission expander or compressor; and an extractor connected to the one of the annular chambers arranged farther away from the interior of the transmission expander or compressor for extracting the sealing gas from said seal arrangement.

2. The shaft seal of claim 1, wherein the a break-in coating consists essentially of a sealing adhesive layer made of CoNiCrAlY and a porous temperature-resistant and corrosion-resistant upper layer made of CoNiCrAlY+BN+polyester.

3. The shaft seal of claim 2, wherein said upper layer of said break-in coating has a defined, adjustable porosity associated with a thermal treatment of said sealing ring with out-gassing of the polyester component in the upper layer of the break-in coating.

4. The shaft seal of claim 1, wherein the seal tips are turned from solid material.

5. A transmission expander or compressor, comprising:

a housing;

at least one rotor having a hub rotatably arranged in said housing;

an output shaft, wherein said at least one rotor being arranged in a floating arrangement on said output shaft;

complementary toothing systems arranged on said hub of said at least one rotor and said shaft and engaging one another; and a shaft seal comprising a seal arrangement, said at least one rotor being guided through said seal arrangement, and said toothing systems being arranged outside said seal arrangement, said seal arrangement comprising:

seal tips arrangeable on one of the shaft or the hub of the rotor, said seal tips being arranged in three seal sections which lie behind one another between an area in the interior of the transmission expander or compressor and the ambient atmosphere surrounding the transmission expander or compressor;

a stationary sealing ring surrounding said seal tips and defining two annular chambers, each annular chamber being arranged between two adjacent ones of said seal sections, said sealing ring comprising a sealing face which lies opposite said seal tips and includes a break-in coating;

a feed connected to the one of the annular chambers arranged closer to the interior of the transmission expander or compressor, said feed arranged for feeding a sealing gas at a pressure higher than the pressure in the interior of the transmission expander or compressor; and an extractor connected to the one of the annular chambers arranged farther away from the interior of the transmission expander or compressor for extracting the sealing gas from said seal arrangement.

* * * * *